US010929683B2

(12) United States Patent
Chen et al.

(10) Patent No.: US 10,929,683 B2
(45) Date of Patent: Feb. 23, 2021

(54) VIDEO PROCESSING METHOD, APPARATUS AND DEVICE

(71) Applicant: BEIJING BAIDU NETCOM SCIENCE TECHNOLOGY CO., LTD., Beijing (CN)

(72) Inventors: Sijiao Chen, Beijing (CN); Shuai Jiang, Beijing (CN); Shiliang Diao, Beijing (CN); Haijin Liang, Beijing (CN); Yu Luo, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 118 days.

(21) Appl. No.: 16/362,580

(22) Filed: Mar. 22, 2019

(65) Prior Publication Data

US 2019/0370557 A1    Dec. 5, 2019

(30) Foreign Application Priority Data

May 31, 2018    (CN) .......................... 201810556777.4

(51) Int. Cl.
*G06K 9/00*    (2006.01)
*G06K 9/46*    (2006.01)
(Continued)

(52) U.S. Cl.
CPC ..... *G06K 9/00751* (2013.01); *G06K 9/00288* (2013.01); *G06K 9/00302* (2013.01);
(Continued)

(58) Field of Classification Search
CPC ........... G06K 9/00751; G06K 9/00288; G06K 9/00302; G06K 9/00335; G06K 9/4652;
(Continued)

(56) References Cited

FOREIGN PATENT DOCUMENTS

CN    102685574 A  *  9/2012
CN    102685574 A     9/2012
(Continued)

OTHER PUBLICATIONS

A Survey on Visual Content-Based Video Indexing and Retrieval (Year: 2011).*
(Continued)

*Primary Examiner* — Nizar N Sivji
(74) *Attorney, Agent, or Firm* — J.C. Patents

(57) ABSTRACT

A video processing method, apparatus and device. The method includes: acquiring a video to be processed; performing audio processing on a plurality of frames of audios in the video to obtain a first processing result corresponding to each frame of audio; performing image processing on a plurality of frames of images in the video to obtain a second processing result corresponding to each frame of image; determining an entity in the video according to the first processing result and the second processing result; acquiring association information of the entity according to index information of the entity; generating first text information used for describing each frame of image, according to the second processing result corresponding to each frame of image and association information of the entity; and generating a first type of target article according to the plurality of frames of images and first text information of each frame of image.

18 Claims, 6 Drawing Sheets

(51) Int. Cl.
    *G10L 17/06*       (2013.01)
    *G10L 17/00*       (2013.01)

(52) U.S. Cl.
    CPC ....... *G06K 9/00335* (2013.01); *G06K 9/4652* (2013.01); *G10L 17/00* (2013.01); *G10L 17/06* (2013.01)

(58) Field of Classification Search
    CPC ..... G10L 17/005; G10L 17/06; H04N 21/233; H04N 21/23418; H04N 21/26603; H04N 21/4884; H04N 21/84; H04N 21/44008; H04N 21/4394; H04N 21/440236; H04N 21/4402
    See application file for complete search history.

(56) References Cited

FOREIGN PATENT DOCUMENTS

| CN | 105224925 A | * | 1/2016 |
|---|---|---|---|
| CN | 105224925 A | | 1/2016 |

OTHER PUBLICATIONS

The extended European Search Report of corresponding European application No. 19162925.2-1208, dated May 8, 2019.

\* cited by examiner

VIDEO PROCESSING METHOD, APPARATUS AND DEVICE

CROSS-REFERENCE TO RELATED APPLICATION

This application claims priority to Chinese Patent Application No. 201810556777.4, filed on May 31, 2018, which is hereby incorporated by reference in its entirety.

TECHNICAL FIELD

Embodiments of the present disclosure relate to the field of computer technology, and in particular, to a video processing method, apparatus and device.

BACKGROUND

With the development of the video industry, video resources are becoming increasingly abundant on the Internet. A user may download/upload video from/to the Internet via a terminal device, and play and watch the video on the terminal device.

Presently, mobile terminals have become an indispensable communication tool for the user. In addition, users may also derive videos from the Internet to play and watch the videos on the mobile terminals. However, the user may be occasionally in an environment where playing videos on the mobile terminal may not be very appropriate. For example, the user may be in a quiet place where playing videos on the mobile terminal may disturb the others.

In the prior art, a video is converted into a text article by manual editing to suit the needs of the user in different environments, but manual processing is not efficient.

SUMMARY

Embodiments of the present disclosure provide a video processing method, apparatus and device to improve the efficiency in converting a video to a target article.

In a first aspect, an embodiment of the present disclosure provides a video processing method, including:

acquiring a video to be processed;

performing audio processing on a plurality of frames of audios in the video to obtain a first processing result corresponding to each frame of audio;

performing image processing on a plurality of frames of images in the video to obtain a second processing result corresponding to each frame of image;

determining an entity in the video according to the first processing result and the second processing result;

acquiring association information of the entity according to index information of the entity;

generating first text information, which is used for describing the each frame of image, according to the second processing result corresponding to the each frame of image and the association information of the entity; and generating a first type of target article according to the plurality of frames of images and the first text information of the each frame of image.

In a second aspect, an embodiment of the present disclosure provides a video processing apparatus, including:

an acquiring module, configured to acquire a video to be processed;

an audio processing module, configured to perform audio processing on a plurality of frames of audios in the video to obtain a first processing result corresponding to each frame of audio;

an image processing module, configured to perform image processing on a plurality of frames of images in the video to obtain a second processing result corresponding to each frame of image;

a determining module, configured to determine an entity in the video according to the first processing result and the second processing result;

the acquiring module is further configured to acquire association information of the entity according to index information of the entity;

a generating module, configured to: generate first text information, which is used for describing the each frame of image, according to the second processing result corresponding to the each frame of image and the association information of the entity; and generate a first type of target article according to the plurality of frames of images and the first text information of the each frame of image.

In a third aspect, an embodiment of the present disclosure provides a video processing device, including:

a memory;

a processor; and a computer program, where the computer program is stored in the memory and is configured to be executed by the processor to implement the method according to the first aspect.

In a fourth aspect, an embodiment of the present disclosure provides a computer readable storage medium having a computer program stored thereon, where the storage medium is executed by a processor to implement the method according to the first aspect.

According to the video processing method, apparatus and device provided in the embodiments of the present disclosure, the audio and images in the video are processed separately, and the entity in the video is determined according to the processing results. Further, the association information of the entity is obtained according to the index information of the entity. The text description information of each frame of image is generated according to the processing results and the association information of the entity, and the target article including both images and texts may be generated according to the images in the video and the text description information of each frame of image. Compared with manually converting the video into a text article, the efficiency in converting a video into a target article may be improved.

Specific embodiments of the present disclosure have been illustrated by the drawings, which will be described in more detail later. The drawings and the textual descriptions are by no means intended to limit the scope of the present disclosure. Rather, they aim at explaining the concepts of the disclosure to those skilled in the art by making reference to specific embodiments.

DETAILED DESCRIPTION OF THE EMBODIMENTS

Exemplary embodiments will be described in detailed herein, examples of which are illustrated in the accompanying drawings. When the following description refers to the accompanying drawings, the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
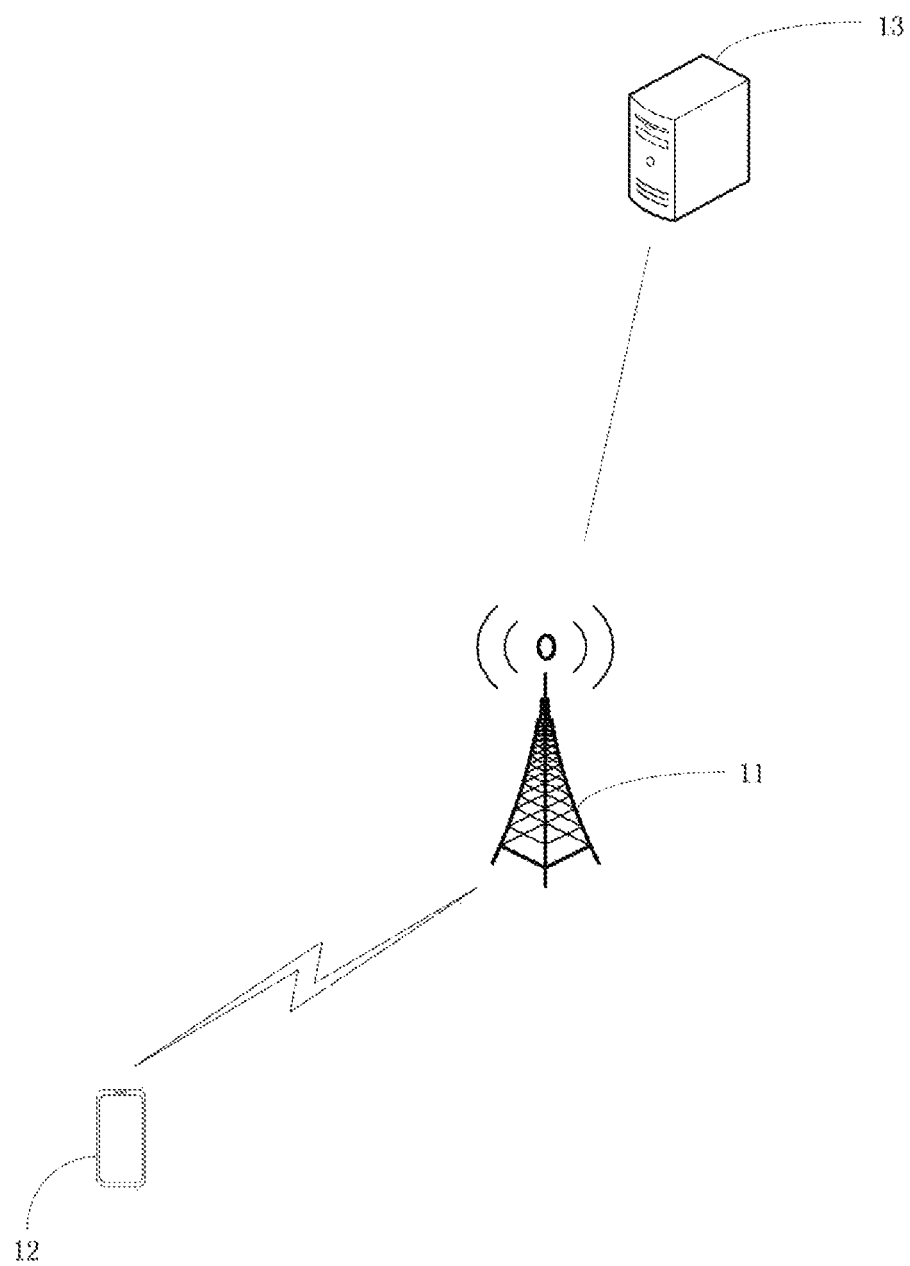
FIG. 1 is a schematic diagram illustrating an application scenario according to an embodiment of the present disclosure.

The video processing method provided in the present disclosure is applicable to the communication system shown in FIG. 1. As shown in FIG. 1, the communication system includes: an access network device 11, a terminal device 12, and a server 13. The access network device 11 may be a device such as a base station, a relay station, or an access point. The terminal device 12 may be a mobile terminal, such as a smart phone, a personal computer or a tablet computer, etc. The server 13 in particular is located on the network side. The terminal device 12 may download a video from the server 13 via the access network device 11. Or, the server 13 may receive a video uploaded by the terminal device 12 via the access network device 11.

The video processing method provided in the present disclosure aims to solve the above technical problems of the prior art.

Now, the technical solutions of the present disclosure and how the technical solutions of the present application solve the above technical problems will be detailed with reference to specific embodiments. The following specific embodiments may be recombined with each other, and the same or similar concepts or processes may not be repeated in some embodiments. Now, embodiments of the present disclosure will be described with reference to the accompanying drawings.

Figure 2:
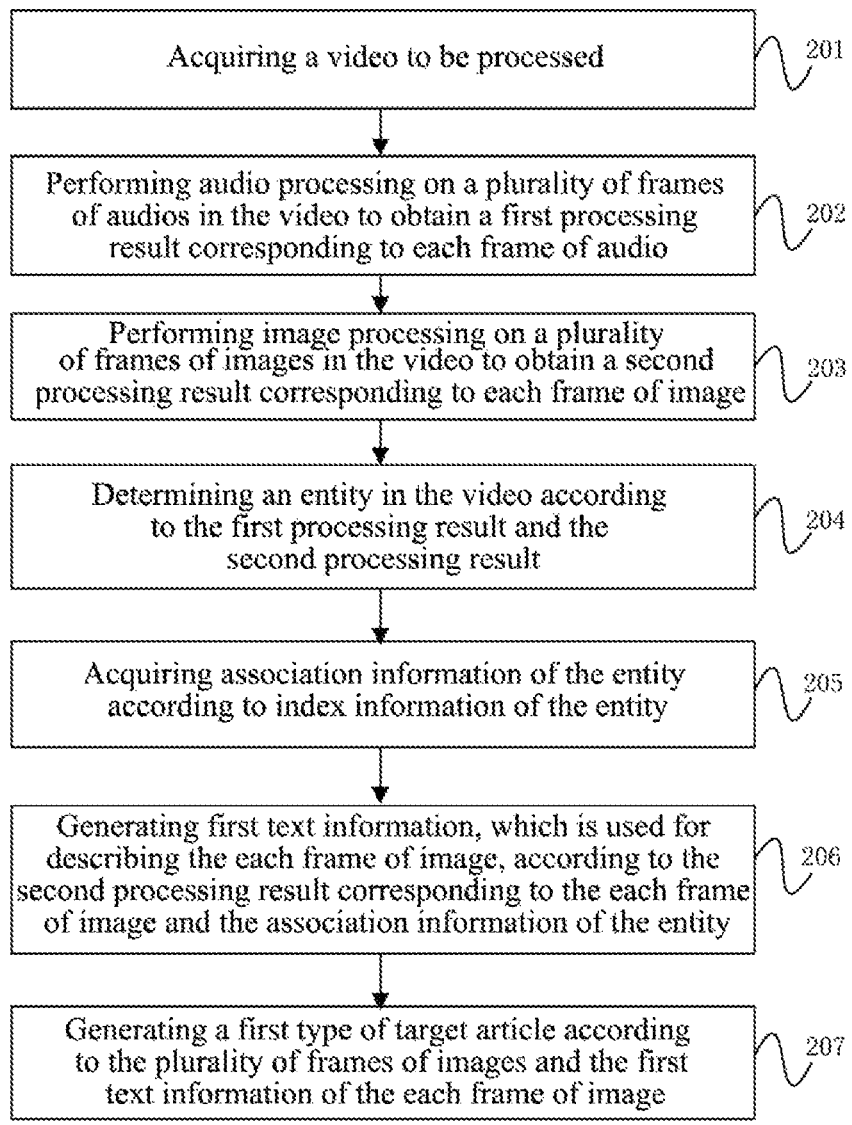
FIG. 2 is a flowchart illustrating a video processing method according to an embodiment of the present disclosure.

FIG. 2 is a flowchart illustrating a video processing method according to an embodiment of the present disclosure. The embodiment of the present disclosure provides a video processing method for the above technical problems in the prior art. The specific steps of the method are as follows.

Step 201: acquiring a video to be processed.

In this embodiment, the video may be one downloaded by the terminal device 12 from the server 13 via the access network device 11, as shown in FIG. 1, or may be one uploaded by the terminal device 12 via the access network device 11 onto the server 13. The terminal device 12 or the server 13 may process the video according to the video processing method described in this embodiment. The video will be processed by the server 13 as an example below. The video may be one pre-stored in the server 13, or one acquired by the server 13 from a database associated therewith.

Step 202: performing audio processing on a plurality of frames of audios in the video to obtain a first processing result corresponding to each frame of audio.

It can be understood that the video consists of audio and images. Optionally, the video includes a plurality of frames of audios and a plurality of frames of images. For example, after acquiring a video uploaded by the terminal device 12, the server 13 may perform audio processing the plurality of frames of audios in the video to obtain a first processing result corresponding to each frame of audio. Optionally, the first processing result corresponding to the each frame of audio includes at least one of the followings: voiceprint information corresponding to the each frame of audio, text information corresponding to the each frame of audio and timing information of the each frame of audio in the video.

Here, in order to distinguish the above text information from the ones for describing each frame of image coming up in the subsequent steps, the text information for describing each frame of image is referred to as the first text information, and the text information corresponding to each frame of audio is referred to as the second text information.

For example, the server 13 may analyze the voiceprint information in each frame of audio. It can be understood that the voiceprint information of different individuals may differ. The corresponding individual speaking in the respective audio can be recognized though the voiceprint information. In addition, the server 13 may further convert the audio in the video into text information and determine the time when the audio appears in the video. For example, in a video with a total duration of 180 seconds, a person matching the voiceprint information uttered a sentence between the third and sixth second of the 180 seconds, and the server 13 may analyze the time when the audio appears in the video according to the characteristics of the audio.

Step 203: performing image processing on a plurality of frames of images in the video to obtain a second processing result corresponding to each frame of image.

Optionally, the server 13 may capture a frame of image in the video by seconds, and then perform the image processing on the image to obtain a second processing result corresponding to each frame of image. Optionally, the second processing result corresponding to the each frame of image includes at least one of the followings: subtitle information, person information and background information in the each frame of image. The person information includes at least one of the followings: person action information, person expression information and person name.

For example, the server 13 may recognize a region having a character in each frame of image by machine learning, and determine the subtitle information based on the region having the character. A person region and a background region in the image may be recognized according to a saliency recognition algorithm. In addition, the server 13 may determine the person action information by recognizing the body part of the person in the image, and determine the person expression information by recognizing the face of the person in the image. It can be understood that not all frames of images include a person.

In addition, the person name may also be determined by the facial feature of the person. For example, the server 13 or a database associated therewith may store a massive number of person images and attribute information, such as a name, of the person. According to the facial feature of the person in the image corresponding to the video, the server 13 queries the server 13 or the database to acquire a person image matching the facial feature, and then determine the person name matching the facial feature.

Step 204: determining an entity in the video according to the first processing result and the second processing result.

The server 13 determines an entity in the video according to the first processing result and the second processing result, where the entity may in particular be a name of the video, such as the title of a TV drama. In addition, the entity may also be a person shown in the video. For example, the video may be a clip from a TV drama, and a person shown in the video may be recognized by performing facial recognition on each frame of image in the video. Further, according to the number of times different persons appearing on the camera, the appearance ratio of the persons in the video can be determined, so that a leading role in the video can be determined. In addition, the name of the drama may also be displayed in some frames of images in the video, and the server 13 may acquire the name of the drama via the image processing described above.

Step 205: acquiring association information of the entity according to index information of the entity.

For example, the server 13 recognizes that the name of the drama is "Sui Tang Yan Yi", and the person frequently appearing in the video is "Wang Baoqiang". Then, the server 13 may use "Sui Tang Yan Yi" and "Wang Baoqiang" as the index information. The related historical background and descriptions of the drama as well as the role played by "Wang Baoqiang" in the drama, such as "Li Yuanba", are acquired by querying the database. Further, the server 13 may also use the "Li Yuanba" as the index information to acquire introduction information about "Li Yuanba".

Step 206: generating first text information, which is used for describing the each frame of image, according to the second processing result corresponding to the each frame of image and the association information of the entity.

For example, a certain frame of image in the video includes the person "Wang Baoqiang" and the subtitle information corresponding to the lines of "Wang Baoqiang", and the server 13 may determine that "Wang Baoqiang" plays the role of "Li Yuanba" according to the "Wang Baoqiang". The server 13 further performs the image processing on the frame of image to determine the action and expression of "Wang Baoqiang" in the frame of image, thereby generating text information describing the frame of image, which may be, for example, "after heard that, Li Yuanba laughed and said: your hammer is bigger than mine." The method for generating the description information corresponding to other images in the video is similar to this, which will not be repeated herein.

Step 207: generating a first type of target article according to the plurality of frames of images and the first text information of the each frame of image.

In this embodiment, the target article may be of a type including, but not limited to, the following: a type of video clip description, a type of film highlights of a star, and a type of video transcription. Optionally, in this embodiment, the type of video clip description is referred to as a first type, the type of video transcription is referred as a second type, and the type of film highlights of a star is referred as the third type.

Having generated the description information, i.e., the first text information, of each frame of image in the video, the server 13 may generate the target article of the type of video clip description according to the plurality of frames of images in the video and the description information of each frame of image, where the target article of the type of video clip description is appropriate for the video of a dialogue between the persons.

In a possible implementation, at least one frame of target image, whose information gain is above a threshold, is selected from the plurality of frames of images according to information gain of the each frame of image of the plurality of frames of images; and the first type of target article is generated according to the at least one frame of target image whose information gain is above the threshold and the first text information of the each frame of image.

It can be understood that the video includes a plurality of frames of images, but the information gain of each frame of image may be different. According to the information gain of each frame of image, at least one frame of target image whose information gain is above a threshold may be selected from the plurality of frames of images. For example, the video includes a total of 180 frames of images, there may be only images 10 of the frames of images whose information gains are above the threshold, removing images with lower resolution and image that does not match the subject of the target article. Therefore, the 10 frames of images and the description information of each frame of image may be formed into a target article of the type of video clip description. For example, an article template may be pre-stored in the server 13, where the article template includes an image placement region and a description information placement region. The server 13 may places the 10 frames of images and the description information of each frame of image into corresponding regions in the article template, so that the target article of the type of video clip description can be obtained. It can be understood that the target article includes both images and texts. Further, the server 13 may push the target article of the type of video clip description to other terminal devices, so that after the other terminal device receives the target article, the user may be informed of the content of the video by reading the target article. In addition, the server 13 may also push the video together with the target article corresponding to the video to other terminal devices, allowing the users to freely choose to watch the video or read the target article corresponding to the video.

In addition, on the basis of this embodiment, a second type of target article may also be generated according to the plurality of frames of images and the second processing result corresponding to the each frame of image.

It can be understood that there may be many types of videos, including a type of commentary video, e.g., a type of commentary video for demonstrating cooking skills, a type of commentary video for popular science, and the like. For these types of videos, the server 13 may, after recognizing the subtitle information in each frame of image, generate the target article of the type of video transcription according to the plurality of frames of images in the video and the subtitle information of each frame of image. If the video has no subtitle information, the server 13 may also convert the audio in the video into text information, and then generate the target article of the type of video transcription based on the plurality of frames of images and the text information converted from the audio.

In a possible implementation, at least one frame of target image, whose information gain is above a threshold, is selected from the plurality of frames of images according to information gain of each frame of image of the plurality of frames of images, and the second type of target article is generated according to the at least one frame of target image whose information gain is above a threshold and the second processing result corresponding to the each frame of image.

In the same manner as the method for generating the target article of the type of video clip description, the server 13 needs to filter out at least one target frame of image whose information gain is above a threshold from the plurality of frames of images of the video, and the specific method and process are consistent with the above description, which will not be repeated herein. For the type of commentary video for demonstrating cooking skills, the target image may be an image of a key step in the cooking process.

The server 13 may generate the target article of the type of video transcription according to the at least one frame of target image whose information gain is above the threshold and the subtitle information in each frame of image; alternatively, the server 13 may generate the target article of the type of video transcription according to the at least one frame of target image whose information gain is above the threshold and the text information converted from the audio. Further, the server 13 pushes the target article of the type of video transcription to other terminal devices, or pushes the commentary video together with the target article corresponding to the commentary video to other terminal devices.

It can be understood that, in this embodiment, the server performing the video processing method is taken as an example. This embodiment may also be applied to a scenario in which a terminal device preforms the video processing method. After the terminal device obtains the target article corresponding to the video by processing the video, the target article may be uploaded to the server and pushed to other terminal devices by the server.

In addition, the server 13 may also acquire film highlights of a star in the video, and generate the target article of the type of film highlights of a star in a way similar to that of the target article of the type of video clip description (which will not be repeated here) by combining film highlights of the star with the description information of each video frame in the video.

Alternatively, the server 13 may also query for various TV dramas that a star has been starred in, and acquire the star's film highlights from the various TV dramas, and generate the target article of the type of film highlights of a star by combining the star's film highlights with the description information of each TV drama.

In this embodiment of the present disclosure, the audio and images in the video are processed separately, and the entity in the video is determined according to the processing results. Further, the association information of the entity is obtained according to the index information of the entity. The text description information of each frame of image is generated according to the processing results and the association information of the entity, and the target article including both images and texts may be generated according to the images in the video and the text description information of each frame of image. Compared with manually converting the video into a text article, the efficiency in converting a video into a target article may be improved.

Figure 3:
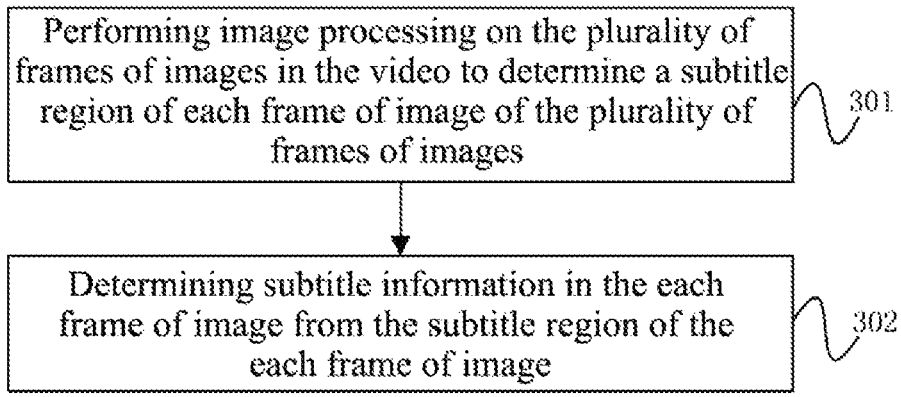
FIG. 3 is a flowchart illustrating a video processing method according to another embodiment of the present disclosure.

FIG. 3 is a flowchart of a video processing method according to another embodiment of the present disclosure. On the basis of the foregoing embodiment, the method of performing image processing on a plurality of frames of images in the video to obtain a second processing result corresponding to each frame of image may specifically include the following steps:

Step 301: performing image processing on the plurality of frames of images in the video to determine a subtitle region of each frame of image of the plurality of frames of images.

In this embodiment, the each frame of image of the video includes a subtitle region that has the following features:

a spatial feature: the location of the subtitle region in the image is relatively fixed, i.e., and the subtitle region typically has the following three alignment modes: aligned to the left, aligned to the right, and aligned to the center.

a time feature: as the number of characters that may be accommodated within the subtitle region is limited, the longer the text information is, the longer of time it will remain in the video, so that the time for the user to go through the text information is enough. For example, text information including 10 characters will appear in four adjacent frames of images, and text information including three characters may only appear in one frame of image. The above is only for illustrative purpose, and the relationship between the length of the text information and the duration of time the text information remains is not limited thereto.

Since the subtitle region has the above features, the server 13 may determine the subtitle region of each frame of image according to the features of the subtitle region.

Step 302: determining subtitle information in the each frame of image from the subtitle region of the each frame of image.

Since the location of the subtitle region in the each frame of image is relatively fixed, the server 13 may, having determined the subtitle information in each frame of image, acquire the subtitle information in the frame of image from the subtitle region of the frame of image.

Figure 4:
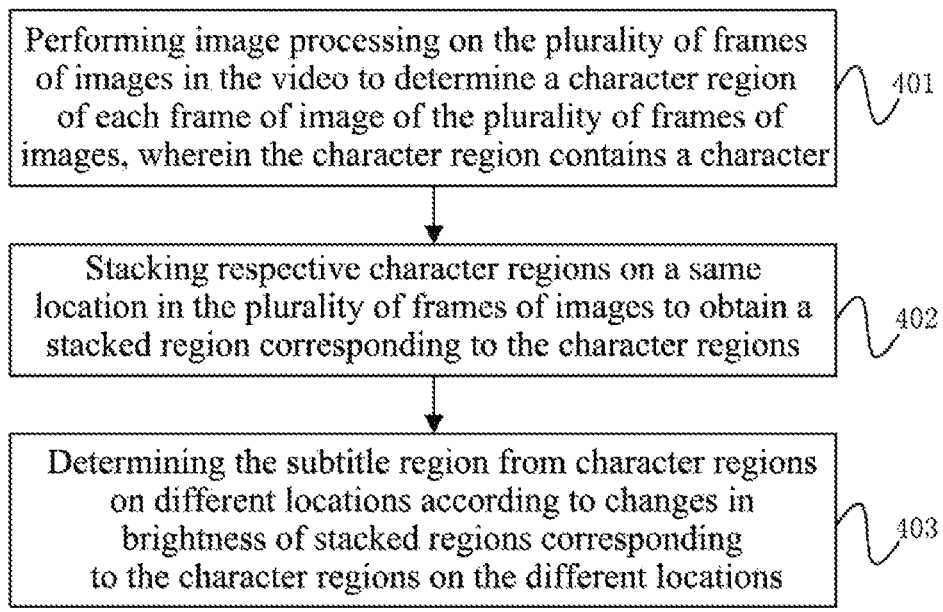
FIG. 4 is a flowchart illustrating a video processing method according to another embodiment of the present disclosure.

In a possible implementation, the performing image processing on the plurality of frames of images in the video to determine a subtitle region of each frame of image of the plurality of frames of images may include the following steps as shown in FIG. 4:

Step 401: performing image processing on the plurality of frames of images in the video to determine a character region of each frame of image of the plurality of frames of images, where the character region contains a character.

Figure 5:
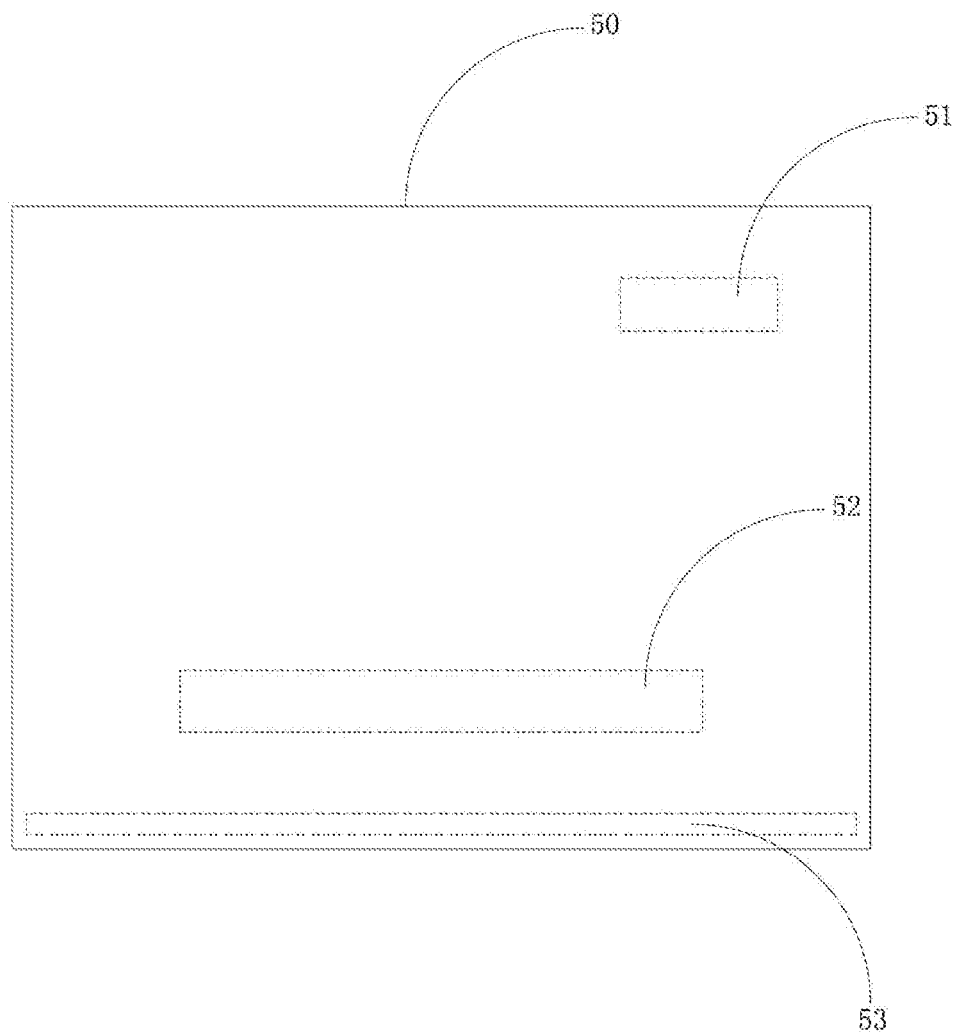
FIG. 5 is a schematic diagram illustrating an image in a video according to an embodiment of the present disclosure.

It can be understood that the images in the video may include display regions for news, advertisements or the video title besides the subtitle region, and the news, advertisements and the video title are presented in text form and may be distributed in different regions of the image. As shown in FIG. 5, 50 denotes a certain frame image of the video, where the video title is located in a region 51, the subtitle region corresponds to a region 52, and scrolling information, such as news and advertisements, is located in a region 53.

When performing the image processing on the image 50, the server 13 may determine the character regions including a character in the image 50, such as the region 51, the region 52 and the region 53. The server 13 needs to further determine which of the regions 51, 52 and 53 is the subtitle region, i.e., the region where the actor's lines are displayed. This is merely a schematic illustration, and does not limit the layout of the regions 51, 52 and 53 in the image.

Step 402: stacking respective character regions on a same location in the plurality of frames of images to obtain a stacked region corresponding to the character regions on the location.

Optionally, the locations of the regions 51, 52 and 53 may be relatively fixed in each frame of image, and the server 13 may stack a plurality of frames of images in the video, where the plurality of frames of images may be all the images included in the video, or multiple frames of images adjacent to the image 50. It can be understood that stacking the plurality of frames of images is equivalent to stacking the regions 51, stacking the regions 52 and stacking the regions 53 in the respective frames of images, so that the stacked regions respectively corresponding to the regions 51, 52 and 53 are obtained.

Step 403: determining the subtitle region from character regions on different locations according to changes in brightness of stacked regions corresponding to the character regions on the different locations.

It can be understood that the video title displayed in the region 51, e.g., the title of a TV drama, may be of a fixed length. The subtitles displayed in the region 52 may be of a variable length, for example, subtitles displayed in some images are long while subtitles displayed in some images are short. The scrolling information displayed in the region 53, such as news and advertisements, is also of a variable length, but the scroll information displayed in the majority of the images may fill up the region 53 and the scroll information displayed in the minority of the images may not fill up the region 53. Therefore, the brightness of the stacked region corresponding to the region 51 is uniformly distributed, the brightness of the stacked region corresponding to the region 52 may be gradually varied, and the brightness of the stacked region corresponding to the region 53 may not be gradually varied. Therefore, the subtitle region may be determined according to the distribution of the brightness of the stacked regions corresponding to the regions 51, 52 and 53, respectively.

Optionally, the determining the subtitle region from character regions on different locations according to changes in brightness of stacked regions corresponding to the character regions on the different locations may include the following possible implementations.

One of the possible implementations is: when brightness of a stacked region corresponding to a character region on a location falls off from a left side to a right side of the stacked region, determining the character region on the location as the subtitle region.

For example, when the subtitle region is aligned to the left, there will always be a character shown on the left side of the subtitle region, but there may or may not be a character shown on the middle or right side of the subtitle region. Thus, the brightness of the stacked region corresponding to the subtitle region will fall off from the left side to the right side of the stacked region. Therefore, when the stacked region corresponding to the region 52 fulfills the condition that the brightness falls off from the left side to the right side of the stacked region while the stacked regions respectively corresponding to the region 51 and region 53 do not fulfill the condition, the region 52 is determined as the subtitle region.

Another possible implementation is: when brightness of a stacked region corresponding to a character region on a location falls off from a right side to a left side of the stacked region, determining the character region on the location as the subtitle region.

For example, when the subtitle region is aligned to the right, then for the same reason as for the left-aligned mode, the brightness of the stacked region corresponding to the subtitle region will fall off from the right side to the left side of the stacked region. Therefore, when the stacked region corresponding to the region 52 fulfills the condition that the brightness falls off from the right side to the left side of the stacked region while the stacked regions respectively corresponding to the region 51 and region 53 do not fulfill the condition, the region 52 is determined as the subtitle region.

Yet another possible implementation is: when brightness of a stacked region corresponding to a character region on a location falls off from a center to both a left side and a right side of the stacked region, determining the character region on the location as the subtitle region.

For example, when the subtitle region is aligned to the center, there will always be a character shown in the center location of the subtitle region, but there may or may not be a character shown on the left and right sides of the subtitle region. Thus, the brightness of the stacked region corresponding to the subtitle region will fall off from the center to the left and right sides of the stacked region. Therefore, when the stacked region corresponding to the region 52 fulfills the condition that the brightness falls off from the center of the stacked region to the left and right sides while the stacked region respectively corresponding to the region 51 and region 53 do not fulfill the condition, the region 52 is determined as the subtitle region.

As another possible implementation, in this embodiment, the subtitle region may also be determined from the regions 51, 52 and 53 according to the time feature of the subtitle region.

In the subtitle region, the longer the text information in the subtitle is, the longer of time it will remain in the video. For example, when the audio between the third and sixth second of the video corresponds to a sentence spoken by a person, the subtitle corresponding to the audio will stay on each frame of images between the third and sixth seconds, that is, the subtitles displayed in each of the frames of images between the third and sixth seconds will be the same. However, for scrolling information, such as news and advertisements, the displayed texts corresponding to news and advertisements will be different in consecutive frames of images.

Optionally, the server 13 denotes the text displayed in the region 51 of each frame of image as a first string, the text displayed in the region 52 as a second string, and the text displayed in the region 53 as a third string. The server 13 counts the number of consecutive video frames in which the same first string appears, counts the number of consecutive video frames in which the same second string appears, and counts the number of consecutive video frames in which the same third string appears. It can be understood that when a video title is displayed in the region 51, the video title will appear in each frame of the video. When the region 52 is a subtitle region, the same subtitle in the region 52 may appear in three to five consecutive frames of images. When the region 53 displays scrolling information such as news or advertisements, etc., the string displayed in the region 53 will be different in consecutive frames of images.

In embodiments of the disclosure, the video is converted into an article with text, so that the user may acquire the video content in different ways, which increases the flexibility for the user to acquire the video content. In addition, a user who writes the article does not have to write the article word by word. Instead, the user may convert the selected video into an article, and upload it to a server, which improves the efficiency for the user to write an article.

Figure 6:
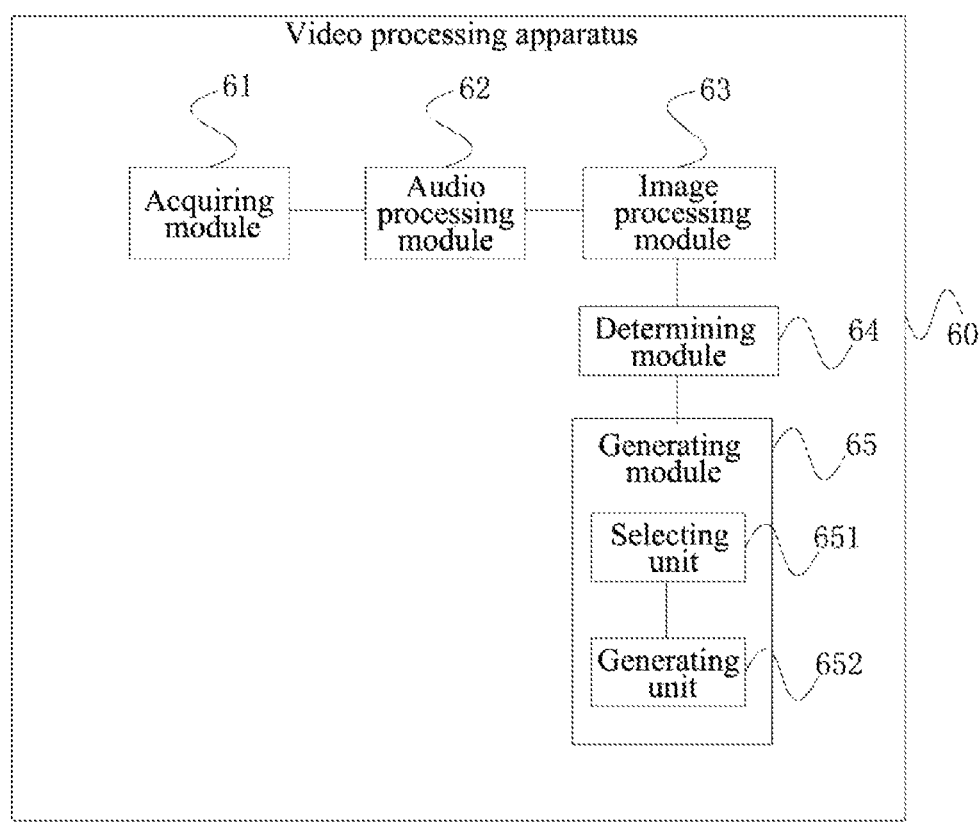
FIG. 6 is a schematic structural diagram illustrating a video processing apparatus according to an embodiment of the present disclosure.

FIG. 6 is a schematic structural diagram illustrating a video processing apparatus according to an embodiment of the present disclosure. The video processing apparatus according to this embodiment of the present disclosure may implement the processing procedure provided in the video processing method embodiments. As shown in FIG. 6, a video processing apparatus 60 includes: an acquiring module 61, an audio processing module 62, an image processing module 63, a determining module 64, a generating module 65. Where the acquiring module 61 is configured to acquire a video to be processed; the audio processing module 62 is configured to perform audio processing on a plurality of frames of audios in the video to obtain a first processing result corresponding to each frame of audio; the image processing module 63 is configured to perform image processing on a plurality of frames of images in the video to obtain a second processing result corresponding to each frame of image; the determining module 64 is configured to determine an entity in the video according to the first processing result and the second processing result; and the acquiring module 61 is further configured to acquire association information of the entity according to index information of the entity; the generating module 65 is configured to generate first text information, which is used for describing the each frame of image, according to the second processing result corresponding to the each frame of image and the association information of the entity; and generate a first type of target article according to the plurality of frames of images and the first text information of the each frame of image.

Optionally, the first processing result corresponding to the each frame of audio includes at least one of the followings: voiceprint information corresponding to the each frame of audio, second text information corresponding to the each frame of audio and time information in the video of the each frame of audio Optionally, the second processing result corresponding to the each frame of image includes at least one of the followings: subtitle information, person information and background information in the each frame of image.

Optionally, the person information includes at least one of the followings: person action information, person expression information and person name.

Optionally, the generating module 65 includes a selecting unit 651 and a generating unit 652, where the selecting unit 651 is configured to select, according to information gain of each frame of image of the plurality of frames of images, at least one target image whose information gain is above a threshold from the plurality of frames of images; and the generating unit 652 is configured to generate a first type of target article according to the at least one target image whose information gain is above the threshold and the first text information of the each frame of image.

Optionally, the generating module 65 is further configured to: generate a second type of target article according to the plurality of frames of images and the second processing result corresponding to the each frame of image.

Optionally, the generating module 65 includes a selecting unit 651 and a generating unit 652, where the selecting unit 651 is configured to select according to information gain of each of the plurality of frames of images, at least one target image whose information gain is above a threshold from the plurality of frames of images; and the generating unit 652 is configured to generate a second type of target article according to the at least one target image whose information gain is above the threshold and the second processing result corresponding to the each frame of image.

Optionally, the image processing module 63 is, when performing image processing on the plurality of frames of images in the video to obtain the second processing result corresponding to the each frame of image, specifically configured to: perform image processing on the plurality of frames of images in the video to determine a subtitle region of each frame of image of the plurality of frames of images; and determine subtitle information in the each frame of image from the subtitle region of the each frame of image.

Optionally, the image processing module 63 is, when performing the image processing on the plurality of frames of images in the video to determine the subtitle region of the each frame of image of the plurality of frames of images, specifically configured to: perform image processing on the plurality of frames of images in the video to determine a character region of each frame of image of the plurality of frames of images, where the character region contains a character; stack respective character regions on a same location in the plurality of frames of images to obtain a stacked region corresponding to the character regions on the location; and determine the subtitle region from character regions on different locations according to changes in brightness of stacked regions corresponding to the character regions on the different locations.

Optionally, the image processing module 63 is, when determining the subtitle region from the character regions on the different locations according to the changes in brightness of the stacked regions corresponding to the character regions on the different locations, specifically configured to: when brightness of a stacked region corresponding to a character region on a location falls off from a left side to a right side of the stacked region, determine the character region on the location as the subtitle region.

Optionally, the image processing module 63 is, when determining the subtitle region from the character regions on the different locations according to the changes in brightness of the stacked regions corresponding to the character regions on the different locations, specifically configured to: when brightness of a stacked region corresponding to a character region on a location falls off from a right side to a left side of the stacked region, determine the character region on the location as the subtitle region.

Optionally, the image processing module 63 is, when determining the subtitle region from the character regions on the different locations according to the changes in brightness of the stacked regions corresponding to the character regions on the different locations, specifically configured to: when brightness of a stacked region corresponding to a character region on a location falls off from a center to both a left side and a right side of the stacked region, determine the character region on the location as the subtitle region.

The video processing apparatus of the embodiment shown in FIG. 6 may be used to implement the technical solutions of the foregoing method embodiments, and the implementation principles and producing similar technical effects are similar, which will not be repeated herein.

Figure 7:
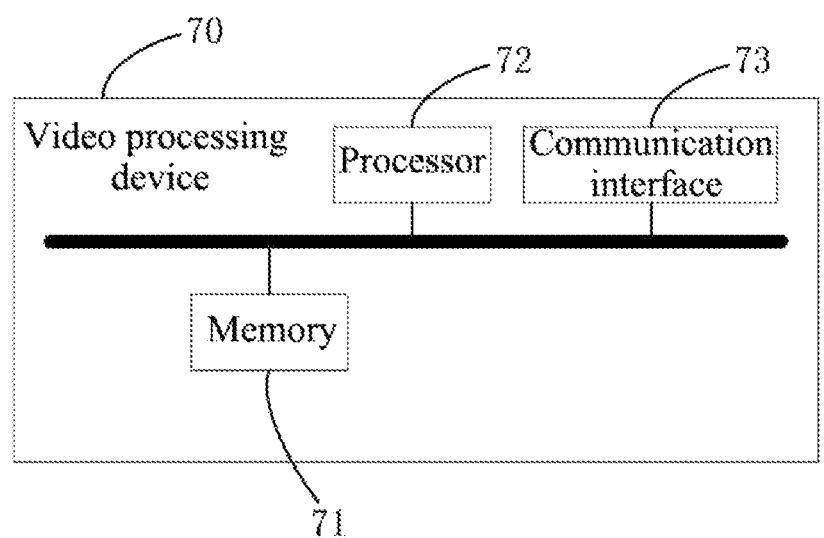
FIG. 7 is a schematic structural diagram illustrating a video processing device according to an embodiment of the present disclosure.

FIG. 7 is a schematic structural diagram of a video processing device according to an embodiment of the present disclosure. The video processing device provided by embodiments of the present disclosure may implement the processing procedure according to the video processing method embodiments. As shown in FIG. 7, the video processing device 70 includes a memory 71, a processor 72, a computer program and a communication interface 73, where the computer program is stored in the memory 71 and is configured to be executed by the processor 72 to implement the video processing methods described in the above embodiments.

The video processing device of the embodiment shown in FIG. 7 may be used to implement the technical solutions of the foregoing method embodiments, and the implementation principles and producing similar technical effects are similar, which will not be repeated herein.

In addition, in this embodiment, a computer readable storage medium is further provided, which has a computer program stored thereon, where the storage medium is executed by a processor to implement the video processing methods described in the above embodiments.

In the embodiments provided in the present disclosure, it should be understood that the disclosed apparatus and method may be implemented in other ways. For instance, the apparatus embodiments described above are merely illustrative. For instance, the units are separated by their logical functions only, and other separations are possible in practical implementation. For instance, multiple units or components may be combined, or be integrated into another system, or some features may be omitted or skipped. In addition, the inter-coupling illustrated or discussed herein, whether a direct coupling or communication connection, may be an indirect coupling or a communication connection via some interfaces, apparatuses or units, and may be electrical, mechanical or otherwise.

The units described as separate components may or may not be physically separated, and the components displayed as a unit may or may not be a physical unit, that is, they may be located at one place, or may be distributed to multiple network elements. Some or all of the units may be selected according to actual needs to achieve the purpose of the solutions of the embodiments.

In addition, various functional units in various embodiments of the present disclosure may be integrated into a single processing unit, or be physically separated into stand-alone units, or two or more units may be integrated into one unit. The above integrated unit may be implemented in the form of hardware or in the form of hardware plus a software functional unit.

The integrated unit implemented in the form of the software functional unit as described above may be stored in a computer readable storage medium. The software functional unit described above may be stored in a storage medium and include instructions for causing a computing device (which may be a personal computer, a server, or a network device, etc.) or a processor to implement some of the steps in the methods of the various embodiments of the present disclosure. The storage medium includes: a USB flash disk, a portable hard disk, a read-only memory (ROM), a random access memory (RAM), a magnetic disk, or an optical disk, and the like, which may store program codes.

A person skilled in the art may clearly understand that the separation of the functional modules described above merely serves as illustrative examples for the convenience and brevity of the descriptions, and in practical applications, the above functions may be assigned to different functional modules as needed. That is, the internal structure of the apparatus may be divided into different functional modules to accomplish all or part of the functions described above. For the specific operating process of the apparatuses described above, reference may be made to the corresponding processes in the foregoing method embodiments, which will not be repeated herein.

Finally, it should be noted that the foregoing embodiments are merely intended for describing, rather than limiting, the technical solutions of the present disclosure. Although the present disclosure is described in detail with reference to the foregoing embodiments, those who of ordinary skill in the art should understand that they may still make modifications to the technical solutions described in the foregoing embodiments, or make equivalent replacements to some or all technical features therein, an those modifications or replacements do not make the essence of corresponding technical solutions depart from the scope of the technical solutions in the embodiments of the present disclosure.

What is claimed is:

1. A video processing method, comprising:
   acquiring a video to be processed;
   performing audio processing on a plurality of frames of audios in the video to obtain a first processing result corresponding to each frame of audio;
   performing image processing on a plurality of frames of images in the video to obtain a second processing result corresponding to each frame of image, wherein the second processing result corresponding to the each frame of image comprises at least one of the followings: subtitle information, person information and background information in the each frame of image;
   determining an entity in the video according to the first processing result and the second processing result, wherein the entity is a title of the video or a person shown in the video;
   using the entity as index information, acquiring association information of the entity according to the index information of the entity by querying a database, wherein the association information is information related to the entity;
   generating first text information, which is used for describing the each frame of image, according to at least one of the subtitle information, the person information and the background information corresponding to the each frame of image and the association information of the entity; and
   generating a first type of article according to the plurality of frames of images and the first text information of the each frame of image, wherein the first type is a type of video clip description, and the first type of article comprises text information of a dialogue between persons appearing in the video.

2. The method according to claim 1, wherein the first processing result corresponding to the each frame of audio comprises at least one of the followings:
   voiceprint information corresponding to the each frame of audio, second text information corresponding to the each frame of audio and time information in the video of the each frame of audio.

3. The method according to claim 1, wherein the person information comprises at least one of the followings:
   person action information, person expression information and person name.

4. The method according to claim 1, wherein the generating a first type of article according to the plurality of frames of images and the first text information of the each frame of image comprises:
   selecting, according to information gain of each frame of image of the plurality of frames of images, at least one target image whose information gain is above a threshold from the plurality of frames of images; and
   generating a first type of article according to the at least one target image whose information gain is above the threshold and the first text information of the each frame of image.

5. The method according to claim 1, further comprising:
   generating a second type of article according to the plurality of frames of images and the second processing result corresponding to the each frame of image.

6. The method according to claim 5, wherein the generating a second type of article according to the plurality of frames of images and the second processing result corresponding to the each frame of image comprises:
   selecting, according to information gain of each of the plurality of frames of images, at least one target image whose information gain is above a threshold from the plurality of frames of images; and
   generating a second type of article according to the at least one target image whose information gain is above the threshold and the second processing result corresponding to the each frame of image.

7. The method according to claim 1, wherein the performing image processing on a plurality of frames of images in the video to obtain a second processing result corresponding to each frame of image comprises:

performing image processing on the plurality of frames of images in the video to determine a subtitle region of each frame of image of the plurality of frames of images; and determining subtitle information in the each frame of image from the subtitle region of the each frame of image.

8. The method according to claim 7, wherein the performing image processing on the plurality of frames of images in the video to determine a subtitle region of each frame of image of the plurality of frames of images comprises:

performing image processing on the plurality of frames of images in the video to determine a character region of each frame of image of the plurality of frames of images, wherein the character region contains a character;

stacking respective character regions on a same location in the plurality of frames of images to obtain a stacked region corresponding to the character regions on the location; and determining the subtitle region from character regions on different locations according to changes in brightness of stacked regions corresponding to the character regions on the different locations.

9. The method according to claim 8, wherein the determining the subtitle region from character regions on different locations according to changes in brightness of stacked regions corresponding to the character regions on the different locations comprises:

when brightness of a stacked region corresponding to a character region on a location falls off from a left side to a right side of the stacked region, determining the character region on the location as the subtitle region.

10. The method according to claim 8, wherein the determining the subtitle region from character regions on different locations according to changes in brightness of stacked regions corresponding to the character regions on the different locations comprises:

when brightness of a stacked region corresponding to a character region on a location falls off from a right side to a left side of the stacked region, determining the character region on the location as the subtitle region.

11. The method according to claim 8, wherein the determining the subtitle region from character regions on different locations according to changes in brightness of stacked regions corresponding to the character regions on the different locations comprises:

when brightness of a stacked region corresponding to a character region on a location falls off from a center to both a left side and a right side of the stacked region, determining the character region on the location as the subtitle region.

12. A video processing apparatus, comprising: a processor and a non-transitory computer-readable medium for storing program codes, which, when executed by the processor, cause the processor to:

acquire a video to be processed;

perform audio processing on a plurality of frames of audios in the video to obtain a first processing result corresponding to each frame of audio;

perform image processing on a plurality of frames of images in the video to obtain a second processing result corresponding to each frame of image, wherein the second processing result corresponding to the each frame of image comprises at least one of the followings: subtitle information, person information and background information in the each frame of image;

determine an entity in the video according to the first processing result and the second processing result, wherein the entity is a title of the video or a person shown in the video;

use the entity as index information, acquire association information of the entity according to the index information of the entity by querying a database, wherein the association information is information related to the entity;

generate first text information, which is used for describing the each frame of image, according to at least one of the subtitle information, the person information and the background information corresponding to the each frame of image and the association information of the entity; and generate a first type of article according to the plurality of frames of images and the first text information of the each frame of image, wherein the first type is a type of video clip description, and the first type of article comprises text information of a dialogue between persons appearing in the video.

13. The video processing apparatus according to claim 12, wherein the first processing result corresponding to the each frame of audio comprises at least one of the followings:

voiceprint information corresponding to the each frame of audio, second text information corresponding to the each frame of audio and time information in the video of the each frame of audio.

14. The video processing apparatus according to claim 12, wherein the person information comprises at least one of the followings:

person action information, person expression information and person name.

15. The video processing apparatus according to claim 12, wherein the program codes further cause the processor to:

select, according to information gain of each frame of image of the plurality of frames of images, at least one target image whose information gain is above a threshold from the plurality of frames of images; and generate a first type of article according to the at least one target image whose information gain is above the threshold and the first text information of the each frame of image.

16. The video processing apparatus according to claim 12, wherein the program codes further cause the processor to:

generate a second type of article according to the plurality of frames of images and the second processing result corresponding to the each frame of image.

17. The video processing apparatus according to claim 12, wherein the program codes further cause the processor to:

perform image processing on the plurality of frames of images in the video to determine a subtitle region of each frame of image of the plurality of frames of images; and determine subtitle information in the each frame of image from the subtitle region of the each frame of image.

18. A non-transitory computer readable storage medium having a computer program stored thereon, wherein the storage medium is executed by a processor to implement a video processing method, wherein the video processing method comprises:

acquiring a video to be processed;

performing audio processing on a plurality of frames of audios in the video to obtain a first processing result corresponding to each frame of audio;

performing image processing on a plurality of frames of images in the video to obtain a second processing result corresponding to each frame of image, wherein the second processing result corresponding to the each frame of image comprises at least one of the followings: subtitle information, person information and background information in the each frame of image;

determining an entity in the video according to the first processing result and the second processing result, wherein the entity is a title of the video or a person shown in the video;

using the entity as index information, acquiring association information of the entity according to the index information of the entity by querying a database, wherein the association information is information related to the entity;

generating first text information, which is used for describing the each frame of image, according to at least one of the subtitle information, the person information and the background information corresponding to the each frame of image and the association information of the entity; and generating a first type of article according to the plurality of frames of images and the first text information of the each frame of image, wherein the first type is a type of video clip description, and the first type of article comprises text information of a dialogue between persons appearing in the video.

* * * * *